E. M. COLE.
DUPLEX PLANTER.
APPLICATION FILED JAN. 14, 1920.

1,388,519.

Patented Aug. 23, 1921.

INVENTOR.
Eugene M. Cole,
BY J. Hanson Boyden.
ATTORNEY.

UNITED STATES PATENT OFFICE.

EUGENE M. COLE, OF CHARLOTTE, NORTH CAROLINA.

DUPLEX PLANTER.

1,388,519.  Specification of Letters Patent.  Patented Aug. 23, 1921.

Application filed January 14, 1920. Serial No. 351,280.

*To all whom it may concern:*

Be it known that I, EUGENE M. COLE, a citizen of the United States, residing at Charlotte, in the county of Mecklenburg and State of North Carolina, have invented certain new and useful Improvements in Duplex Planters, of which the following is a specification.

This invention relates to seed planters, and particularly to single row planters having double or duplex hoppers for containing two kinds of seeds.

More specifically, the present invention relates to planters having inclined seed plates of the kind shown in my prior Patents No. 1,290,090, dated January 7, 1919, and Reissue No. 14,692, dated July 22, 1919, and the general object and purpose is to combine two such inclined plate mechanisms into a single duplex planter.

The present invention seeks to provide improved driving means for the seed plates of such a duplex planter, whereby the machine can be set to drop seed from both hoppers simultaneously and continuously, or from one hopper only, and can be immediately adjusted so as to drop seed from one hopper or the other, at will, all of these adjustments being possible while the planter is in continuous operation.

As in my companion application Serial No. 351,279, filed of even date herewith, I contemplate in this invention a practical, simple and effective arrangement whereby, when it is desired to drop seed from one hopper only, the seed plate of the other hopper is thrown out of operation, and remains stationary.

In my above mentioned companion application, I have claimed broadly all features common to the two applications, covering in the present application only such specific features and modifications as are inherent to the duplex inclined plate construction, or closely associated therewith.

In order that the invention may be readily understood, reference is had to the accompanying drawing, forming part of this specification, and in which:—

Fig. 5 is a plan view of the entire planter on a reduced scale, illustrating the position of the hoppers.

Figure 1:
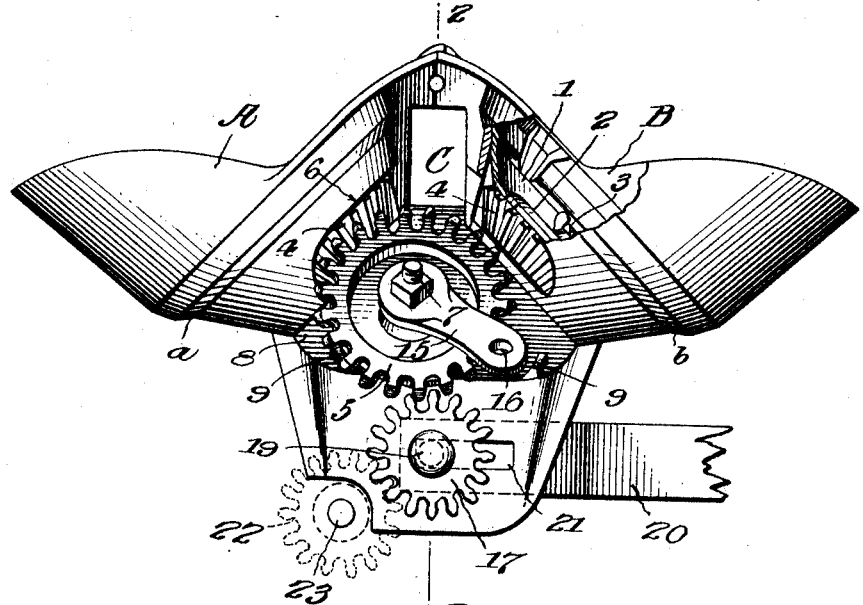
Figure 1 is a side elevation of my improved duplex planter mechanism, parts being broken away.
Figure 2:
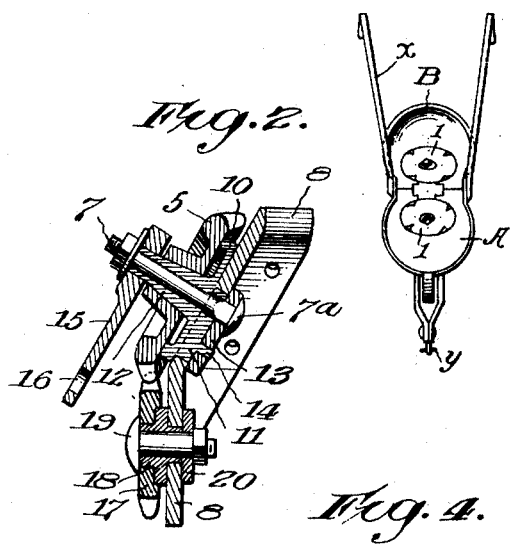
Fig. 2 is a vertical transverse section on the line 2—2 of Fig. 1.

Referring to the drawings in detail, A and B designate the two hoppers. The hoppers have inclined bottoms $a$ and $b$ arranged at an angle to each other, converging upwardly, and having an open space C between them, into which the seed is discharged from both hoppers. I prefer to arrange the hoppers, so that they lie one behind the other relative to the direction of travel of the planter, as shown in Fig. 5. In this figure, $x$ represents the handles of the planter, and $y$ the hook to which the draft is applied.

In the bottom of each hopper is rotatably mounted a seed plate 1 similar to that shown in my Patent 1,290,090 above referred to, such plate being held in position by a cap 2 secured by a center bolt 3. Rigidly secured to the back of each seed plate is a gear 4, these gears being inclined toward each other and converging upwardly, but being out of mesh at all times.

For selectively rotating the seed plates 1, I provide a driving gear 5 which is arranged to engage the gears 4 through openings 6 formed in the hopper bottoms. The driving gear 5 is supported by means of a bolt 7, and associated parts, which are in turn carried by a bolt 8 secured to the hoppers. This plate has on its outer face a pair of stop lugs 9 adapted to engage and limit the movement of an adjustable plate 10 against which the driving gear 5 rests. This plate 10 is preferably circular in form (see Fig. 4) and is provided with an eccentric circular boss or trunnion 11, which is journaled in a similarly shaped opening, formed in the plate 8, and is of a length substantially equal to the thickness of such plate. Projecting upwardly and outwardly from the plate 10 is a tapered boss 12 on which the wheel 5 is journaled, such boss having a central opening through which the bolt 7 passes.

A specially shaped washer 13 fits over the trunnion 11 at the rear and is held in position thereon by means of a stud 14 projecting through a hole in the washer. The washer also has an opening in line with the axis of the boss 12 adapted to receive the bolt 7, and the washer 13 is held against the trunnion 11 and rear face of plate 8 by the head 7ᵃ of the bolt.

Non-rotatably secured to the outer end of the boss 12 is a crank 15 having at its end an eye 16 to which may be attached a link, pole rod, or other operating device or lever, by means of which the boss 12 may be oscillated. Such oscillation does not take place, however, to the axis or center of the boss 12 and plate 10, but to the center $x$ of the trunnion 11. In other words the plate 10, boss 12 and driving gear 5 are caused to oscillate about the trunnion 11, such trunnion turning in its opening in the plate 8, and owing to the eccentricity of the trunnion 11 the gear 5 and associated parts are caused to move in a curved or arc shaped path around the point $x$ as a center.

Figure 3:
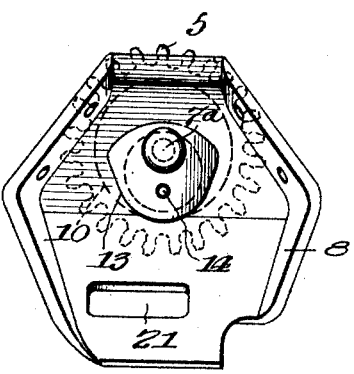
Fig. 3 is a view of the supporting plate and driving gear looking from the opposite side to that shown in Fig. 1.
Figure 4:
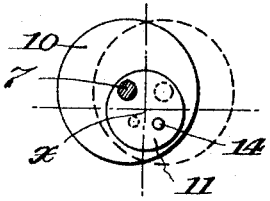
Fig. 4 is a rear elevation of my improved adjusting eccentric, showing the same in two positions.

When, therefore, the plate 10, is swung around the trunnion 11 to one of its position, as shown for example in dotted lines in Fig. 4, the driving gear 5 meshes with the seed plate gear 4 of hopper A, as shown in Fig. 1 and and is out of engagement with the seed plate gear of hopper B. When the seed plate 10 is shifted to the position shown in full lines in Fig. 4, the gear 5 is caused to mesh with the gear 4 of hopper B and is carried out of engagement with the gear 4 of hopper A. If the plate 10 and associated parts be held in the intermediate or central position, as shown in Fig. 3, the gear 5 will be caused to mesh with both of the gears 4 simultaneously.

The selective meshing of the gear 5, with the gears 4 as described, is possible by virtue of the fact that the gear 5 is provided with abnormally long teeth, as described in my companion application, above referred to.

In order to impart movement to the driving gear 5, I have provided a power gear 17 disposed below the same, and so located as to engage therewith in all positions of the driving gear 5. It will be noted that this power gear 17 is disposed on the lower or concave side of the arc shaped path, in which the gear 5 oscillates, and while such arc shaped path is, of course, not concentric with the gear 17, still it tends toward such an arrangement sufficiently to maintain the gears 5 and 17 in constant mesh.

The power gear 17 is driven by a suitable gear 22 mounted on a transverse shaft 23 to which motion is imparted from the ground wheel.

In order to throw the entire seed dropping mechanism out of action, I provide means whereby the power gear 17 may be disengaged from the gears 5 and 22, or at least from the gear 22. To this end the power gear 17 is mounted on a hollow flanged stud 18, through which passes a bolt 19. The stud has a portion passing freely through a slot 21 in the lower part of the plate 8 and on the inside of this plate a link 20 is attached to the bolt 19. It will be seen that by pulling on the link 20, the gear 17 may be shifted longitudinally of the slot 21, so as to be carried out of engagement with one or both of the gears 5 and 22.

It will thus be apparent that I have provided an improved duplex planter with the seed plates inclined, and arranged back to back, and have devised driving mechanism located in the space between the upwardly converging seed plates, such mechanism being selectively adjustable, so that either one or both of the seed plates may be operated as desired.

What I claim is:—

1. In a planter, the combination with a pair of hoppers, of a seed plate in each hopper, a gear rigid with each seed plate, a driving gear, all of said gears lying permanently in different planes, and means for shifting said driving gear into a position where it meshes with both seed plate gears simultaneously, or into positions where it meshes with either one of said gears, only.

2. In a planter, the combination with a pair of hoppers, of a seed plate in each hopper, a gear rigid with each seed plate, a driving gear, all of said gears lying permanently in different planes, disposed at angles to each other, and means for shifting said driving gear into a position where it meshes with both seed plate gears simultaneously, or into positions where it meshes with either one of said gears, only.

3. In a planter, the combination with a pair of hoppers, of a seed plate in each hopper, a gear rigid with each seed plate, a driving gear, all of said gears lying permanently in different planes, and means for shifting said driving gear in its own plane into a position where it meshes with both seed plate gears simultaneously, or into positions where it meshes with either one of said gears, only.

4. In a planter, the combination with a pair of hoppers of a seed plate in each hopper, a gear rigid with each seed plate, a driving gear, all of said gears lying permanently in different planes, means for shifting said driving gear in its own plane into a position in which it meshes with both seed plate gears simultaneously, or into positions in which it meshes with either one of said gears only, and a power gear meshing with said driving gear in all of its positions.

5. In a planter, the combination with a pair of hoppers, of a seed plate in each hopper, a gear rigid with each seed plate, a driving gear, all of said gears lying permanently in different planes, means for shifting said driving gear in a curved path into positions where it meshes with either one or both of said seed plate gears, and a power gear meshing with said driving gear in all of its positions, the axis of said power gear lying on the concave side of said curved path.

6. In a planter, the combination with a pair of hoppers, of a seed plate in each hopper, a gear rigid with each seed plate, a driving gear, all of said gears lying permanently in different planes, and means for shifting said driving gear in its own plane and in an arc-shaped path to cause it to mesh with either one or both of said seed plate gears, as desired.

7. In a planter the combination with a pair of hoppers, of a seed plate in each hopper, a gear rigid with each seed plate, a driving gear, all of said gears lying permanently in different planes, and means for bodily swinging said driving gear about a center eccentric to its own to cause it to mesh with either one or both of said seed plate gears, as desired.

8. In a planter the combination with a pair of seed plate gears lying permanently in different intersecting planes, of a driving gear therefor, means for shifting said driving gear to cause it to mesh with either one or both of said seed plate gears, as desired, a power gear meshing with said driving gear in all of its positions, and means for shifting the said power gear out of mesh with the driving gear.

9. In a planter, the combination with a pair of hoppers, of inclined seed plates in said hoppers disposed with the back of one toward the back of the other, and driving means for said seed plates located in the space between the inclined upwardly converging back faces thereof, and comprising a gear disposed at an angle to both of said plates.

10. In a planter, the combination with a pair of hoppers, of inclined seed plates in said hoppers disposed with the back of one toward the back of the other, and means located in the space between the inclined, upwardly converging back faces of said plates for selectively driving one or the other of the plates, while one or the other remains stationary.

11. In a planter, the combination with a pair of hoppers, of inclined seed plates in said hoppers disposed with the back of one toward the back of the other, gears carried by the back of said seed plates, a driving gear located in the space between the inclined, upwardly converging seed plate gears, and means for shifting said driving gear into mesh with one or the other of said seed plate gears, as described.

12. In a planter, the combination with a pair of hoppers, of a seed plate in each hopper, a gear rigid with each seed plate, said gears lying permanently in separate intersecting planes, a driving gear, means for shifting said driving gear into positions where it meshes with one or the other of said seed plate gears, as desired, and means for rotating said driving gear.

13. In a planter, the combination with a pair of hoppers, of a seed plate in each hopper, a gear rigid with each seed plate, said gears lying permanently in separate intersecting planes, a driving gear lying permanently in a third plane, intersecting the other two, and means for shifting said driving gear in its own plane into positions where it meshes with either one or the other of said seed plate gears, as desired.

14. In a planter, a pair of hoppers disposed adjacent each other and having inclined bottoms converging upwardly toward each other, seed plates working in the inclined bottoms of the hoppers and adapted to deliver seed to a common discharge opening, and means for rotating said plates as the planter moves along the ground, said hoppers being disposed one behind the other relative to the direction of movement of the planter.

In testimony whereof I affix my signature.

EUGENE M. COLE.